(12) United States Patent  
Smith

(10) Patent No.: US 8,919,169 B2  
(45) Date of Patent: Dec. 30, 2014

(54) INTEGRATED DIE TRIM AND METHOD

(75) Inventor: Jerome Carson Smith, Perrysburg, OH (US)

(73) Assignee: Magna International Inc., Aurora, Ontario (CA)

( * ) Notice: Subject to any disclaimer, the term of this patent is extended or adjusted under 35 U.S.C. 154(b) by 729 days.

(21) Appl. No.: 12/601,616

(22) PCT Filed: May 23, 2008

(86) PCT No.: PCT/CA2008/000985  
§ 371 (c)(1),  
(2), (4) Date: Nov. 24, 2009

(87) PCT Pub. No.: WO2008/144893  
PCT Pub. Date: Dec. 4, 2008

(65) Prior Publication Data  
US 2010/0167080 A1  Jul. 1, 2010

Related U.S. Application Data

(60) Provisional application No. 60/931,941, filed on May 25, 2007.

(51) Int. Cl.  
*B21D 31/02* (2006.01)  
*B21D 28/00* (2006.01)  
*B21D 24/16* (2006.01)  
*B21D 22/02* (2006.01)

(52) U.S. Cl.  
CPC ............... *B21D 24/16* (2013.01); *B21D 22/02* (2013.01)  
USPC .............................................. 72/331; 72/338

(58) Field of Classification Search  
USPC ........... 72/326, 327, 331, 334, 338, 325, 339; 83/681, 683, 879, 880  
See application file for complete search history.

(56) References Cited

U.S. PATENT DOCUMENTS

| | | | |
|---|---|---|---|
| 1,719,811 A | 7/1929 | Parker | |
| 1,924,230 A | 8/1933 | Davis | |
| 3,238,753 A | 3/1966 | Benatar et al. | |
| 3,410,084 A | 11/1968 | Cain | |
| 3,516,137 A | 6/1970 | Fisher et al. | |
| 3,774,435 A | 11/1973 | Wales et al. | |
| 4,144,785 A | 3/1979 | Von Langendorff | |
| 4,292,718 A | 10/1981 | Iijima | |
| 4,362,078 A | 12/1982 | Ohnishi et al. | |
| 4,502,309 A * | 3/1985 | Hamilton et al. | 72/364 |
| 4,599,126 A | 7/1986 | Duffield | |
| 4,660,401 A * | 4/1987 | Kohama et al. | 72/331 |
| 6,370,931 B2 | 4/2002 | Bennett | |
| 7,162,906 B2 * | 1/2007 | Van Dalen et al. | 72/331 |
| 2002/0017173 A1 | 2/2002 | Li et al. | |
| 2004/0244539 A1 | 12/2004 | Korb et al. | |
| 2007/0107203 A1* | 5/2007 | Kroger et al. | 29/557 |

FOREIGN PATENT DOCUMENTS

| | | |
|---|---|---|
| JP | 61115625 | 6/1986 |
| JP | 03047637 A | 2/1991 |

* cited by examiner

*Primary Examiner* — Teresa M Ekiert  
(74) *Attorney, Agent, or Firm* — Dickinson Wright PLLC

(57) ABSTRACT

A sheet metal component includes a three dimensionally shaped first surface, a three dimensionally shaped second surface opposite and extending substantially parallel to the first surface and an edge interconnecting and extending about the perimeter of the first and second shaped surfaced. The edge includes a sheared portion formed during a trimming operation and an indented portion formed during a forming operation prior to the trimming operation.

23 Claims, 3 Drawing Sheets

INTEGRATED DIE TRIM AND METHOD

CROSS REFERENCE TO RELATED APPLICATIONS

This U.S. National Stage Patent Application claims priority to PCT International Application No. PCT/CA2008/000985 filed May 22, 2008, entitled "Integrated Die Trim And Method" which claims the benefit of U.S. Provisional Patent Application Ser. No. 60/931,941 filed May 25, 2007, the entire disclosures of the applications being considered part of the disclosure of this application, and hereby incorporated by reference.

BACKGROUND AND SUMMARY

The present disclosure generally relates to sheet metal stamping tools and methods. More particularly, the present disclosure relates to defining an integrated die trim for sheet metal products.

Stamping operations may be used to form shaped steel components. In some processes, the steel sheet is heated prior to forming a shaped blank. The shaped blank may be subsequently heat treated by a quenching operation. After the heat treatment process has been completed, the shaped blank exhibits very high mechanical strength properties. As such, subsequent forming or trimming of the hardened sheet steel blank may be challenging.

A trimming operation may be required subsequent to the heat treatment process to further define an outer perimeter shape or create shaped apertures through the hardened steel blank. A trim die may include an upper trim steel moveable relative to a lower trim steel with the hardened steel blank positioned between the upper and lower trim steels. Due to the mechanical properties of the hardened blank, the forces imparted on the edges of the upper and lower trim steels may be great. Localized impact and shock loading may also exist. As a result of the trimming operation, premature wear or fracture of the trim steels may occur. Costly and time consuming repair or replacement of the trim steels may be required. Similar die wear and service life issues may exist when stamping and/or trimming steel sheets without previously heating and quenching the blank. The trim steels may exhibit undesirable wear even though the steel sheet has not been hardened.

Accordingly, a sheet metal component may be constructed in accordance with the teachings of the present disclosure to include a three dimensionally shaped first surface, a three dimensionally shaped second surface opposite and extending substantially parallel to the first surface and an edge interconnecting and extending about the perimeter of the first and second shaped surfaces. The edge includes a sheared portion formed during a trimming operation and an indented portion formed during a forming operation prior to the trimming operation.

A method of stamping a sheet metal component includes forming a steel sheet in a stamping press to include an indentation. The indentation extends from a first surface of the sheet toward a second opposite surface of the sheet. The method further includes separating a first portion of the sheet from a second portion of the sheet in a trimming press. The separating occurs by shearing through the remaining sheet material located at the indentation previously formed.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
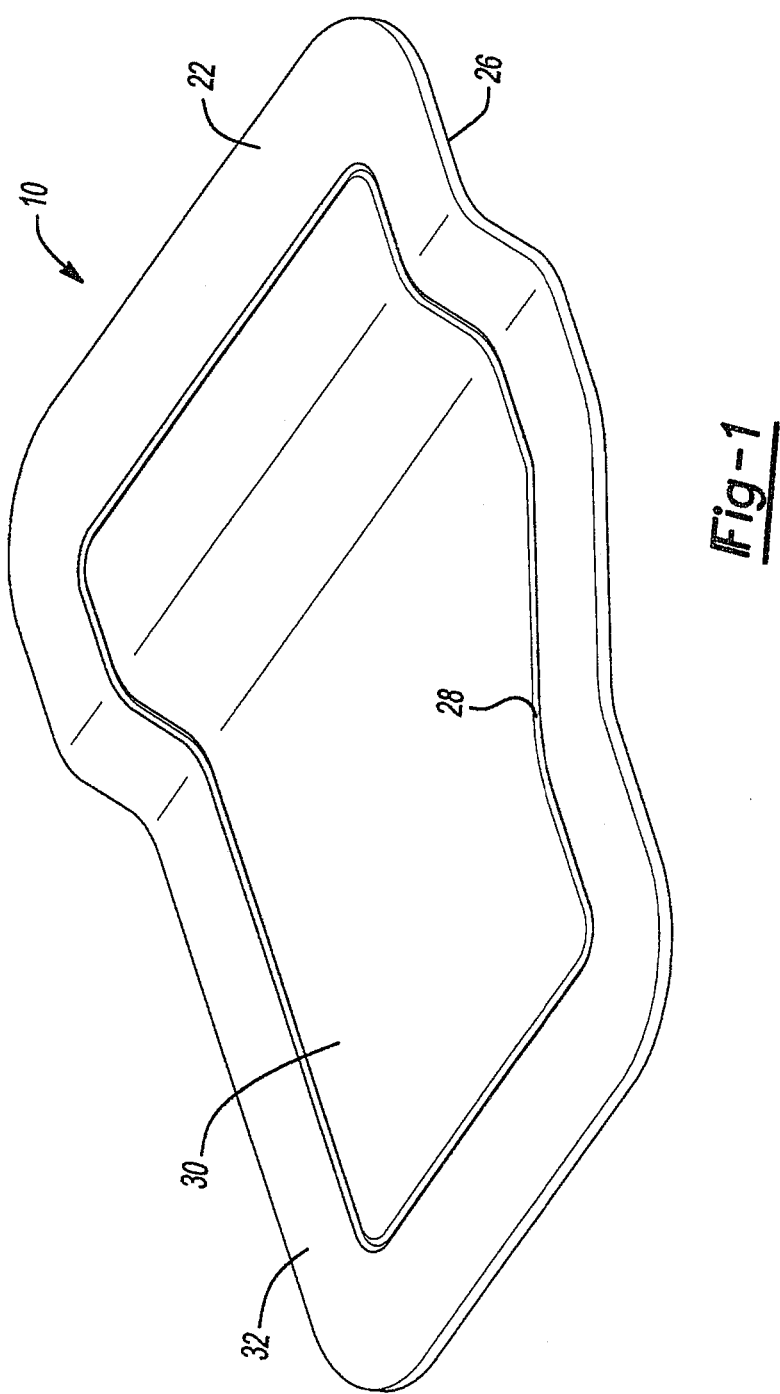
FIG. 1 is a perspective view of a sheet metal blank before completion of a trimming operation.
Figure 2:
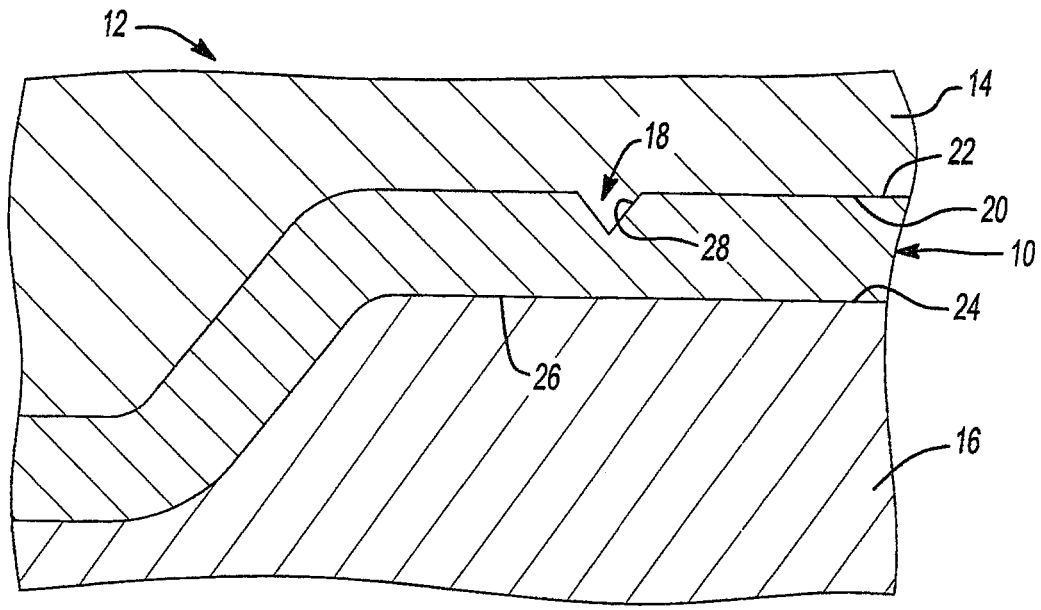
FIG. 2 is a cross-sectional side view of a formed sheet metal blank positioned within a forming press.
Figure 3:
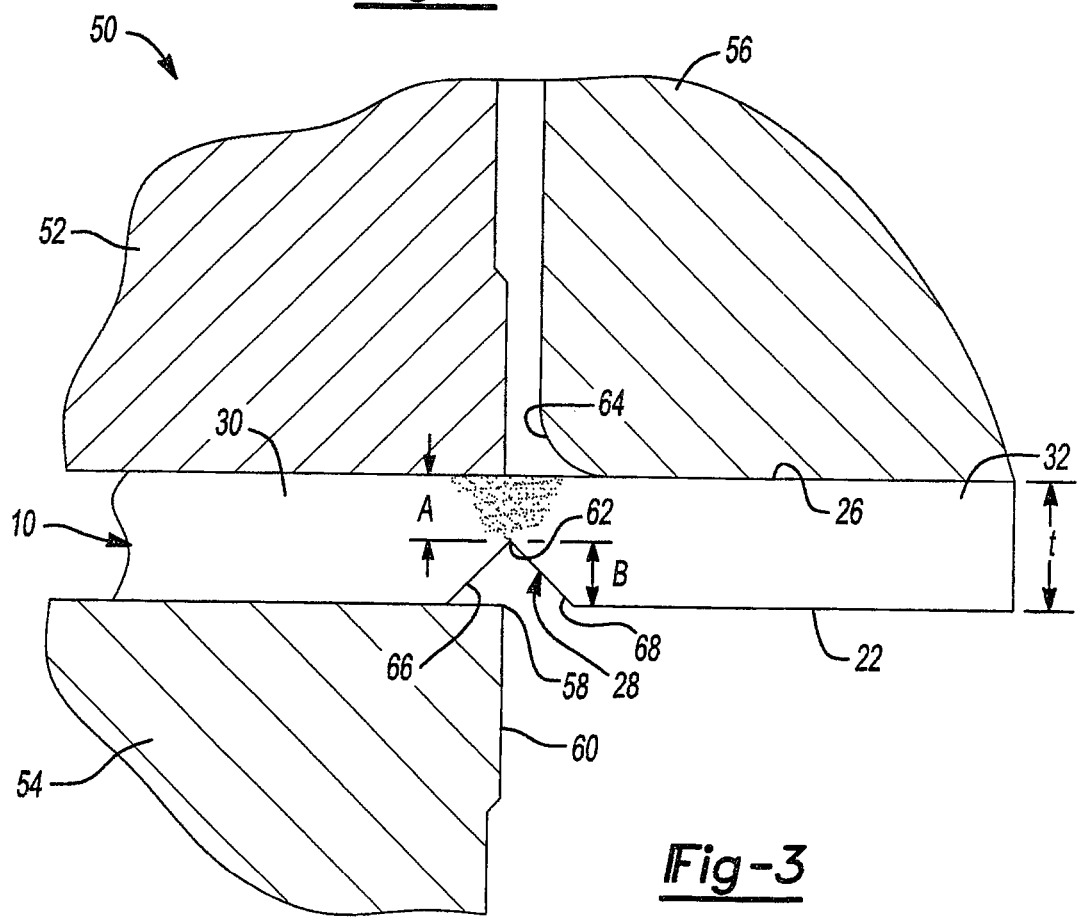
FIG. 3 is a cross-sectional side view of a stamped sheet having an integral die trim positioned with a trimming press in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

FIG. 1 depicts a formed, three dimensionally shaped, blank 10. Blank 10 may be formed from an alloy sheet including materials such as ultra high strength steel and martensitic steel. In one example, a boron alloy steel may be used. The steel is typically provided in thicknesses ranging from 0.8 mm to 2 mm or more. Depending on the material type and sheet thickness, a coil of material may be provided to the stamping facility. Portions of the steel sheet are fed from the coil and positioned within a blanking die. The blanking die cuts a length of material from the coil and may also define a rough outer perimeter of individual blanks to be subsequently formed.

The blank may be transferred to a furnace where it may be heated to a temperature to facilitate forming. In one example, the furnace operates at 920° C. In other instances, the blank may be heated within a forming press. In the present example, the pre-heated or non-preheated blank is transferred to a hot forming press 12 that includes an upper forming die 14 and a lower forming die 16. Upper forming die 14 includes a chisel 18 protruding from a surface 20. Surface 20 defines the shape of an upper surface 22 of formed blank 10. An upper surface 24 of lower forming die 16 defines the shape of a lower surface 26 of formed blank 10.

During the forming operation, upper forming die 14 and lower forming die 16 may be heated to approximately 700° C. The upper and lower forming dies 14, 16 are moved toward one another to impart a force on blank 10. During the forming operation, the contour of formed blank surfaces 22, 26 are defined. Additionally, chisel 18 deforms blank 10 to form an indentation or groove 28 extending inwardly from surface 22. Groove 28 is substantially uninterrupted and extends about the periphery of the blank 10. It should be appreciated that groove 28 may alternatively be formed as a series of grooves aligned with one another. A part portion 30 is defined on one side of groove 28 while a scrap portion 32 is defined on the other side of groove 28 as shown in FIG. 1. In some cases, the relative positions of the part portion and the scrap portion may be reversed if the other portion is the desired product.

Once the shape of formed blank 10 and groove 28 have been defined within the forming press 12, the formed blank 10 is quenched within the die. This may be accomplished by cooling upper forming die 14 and lower forming die 16 by any number of methods previously known. The quenching operation changes the microstructure of the steel and hardens at least portions of formed blank 10. It should be appreciated that the formed blank 10 may alternatively be quenched outside of forming press 12.

After the quenching operation, the heat treated and formed blank 10 is transferred to a trimming press 50. Trimming press 50 includes an upper pad 52, a lower trimming die 54 and an upper trimming die 56. Upper pad 52 is operable to clamp formed blank 10 against lower trimming die 54. Upper trimming die 56 is moveable relative to lower trimming die 54 to separate part portion 30 from scrap portion 32.

Lower trimming die 54 includes a corner 58 positioned in communication with groove 28. Formed blank 10 is positioned within trimming press 50 such that an edge 60 of lower trimming die 54 is substantially aligned with a bottom 62 of groove 28. At bottom 62, a minimum thickness "A" of formed blank 10 exists. Dimension A is defined as the distance between surface 26 and bottom 62. To separate part portion 30 from scrap portion 32, only the minimum thickness A need be sheared in the trimming operation. Bottom 62 also defines a depth of groove "B" as the distance from surface 22 to bottom 62. To achieve a desirable edge condition of part portion 30 after separation from scrap portion 32 and minimize press load, it may be desirable to maintain minimum stock thickness A at a range of one-third to two-thirds a stock thickness t. The shape of groove 28 may also be varied to extend the life of forming press 12 and trimming press 50 while producing a desirable edge condition on part portion 30. Various shapes of groove 28 will be described in greater detail below.

As another method of increasing trim life, upper trimming die 56 is manufactured with a radius 64 as opposed to a sharp edge typically found on most sheet metal punches. It is contemplated that radius 64 is approximately 10% of sheet metal thickness t or may alternatively be 10% of thickness A. During the trimming operation, contact stresses are reduced and disbursed across radius 64 thereby increasing the number of cycles upper trimming die 56 may function prior to requiring repair.

Groove 28 includes a first wall 66 and a second wall 68. First wall 66 of groove 28 acts as an integrated die trim as upper trimming die 56 moves towards lower trimming die 54. Fracture of minimum thickness A occurs prior to corner 58 being loaded to a significant magnitude. In this manner, upper trimming die 56 and lower trimming die 54 may be utilized for many more cycles than previously contemplated due to the formation of groove 28.

Figure 4:
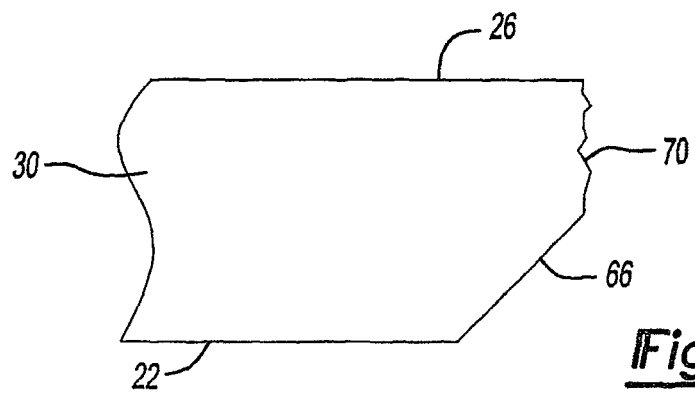
FIG. 4 is a fragmentary cross-sectional view of a part portion of a sheet metal blank separated from a scrap portion.

FIG. 4 depicts part portion 30 separated from scrap portion 32. Part portion 30 includes a fractured section 70 corresponding to the minimum stock thickness portion A and wall 66 as previously defined. The Figure depicts a desirable edge condition without a burr protruding from surface 22.

While the above description relates primarily to a process including hot forming and quenching of the steel workpiece, it should be appreciated that the scope of the present disclosure also includes cold stamping and forming processes. In particular, it is contemplated that groove 28 may be formed during a cold stamping operation. The sheet is not heated prior to the forming operation. Furthermore, the cold stamped sheet need not be heat treated but may proceed directly from a forming press to a trimming press similar to trimming press 50 previously described. It may be beneficial to incorporate the step of forming groove 28 in cold formed sheets having thicknesses greater than or equal to 3 mm. The press load required to separate a part portion from a scrap portion will be greatly reduced due to the presence of groove 28.

Figure 5:
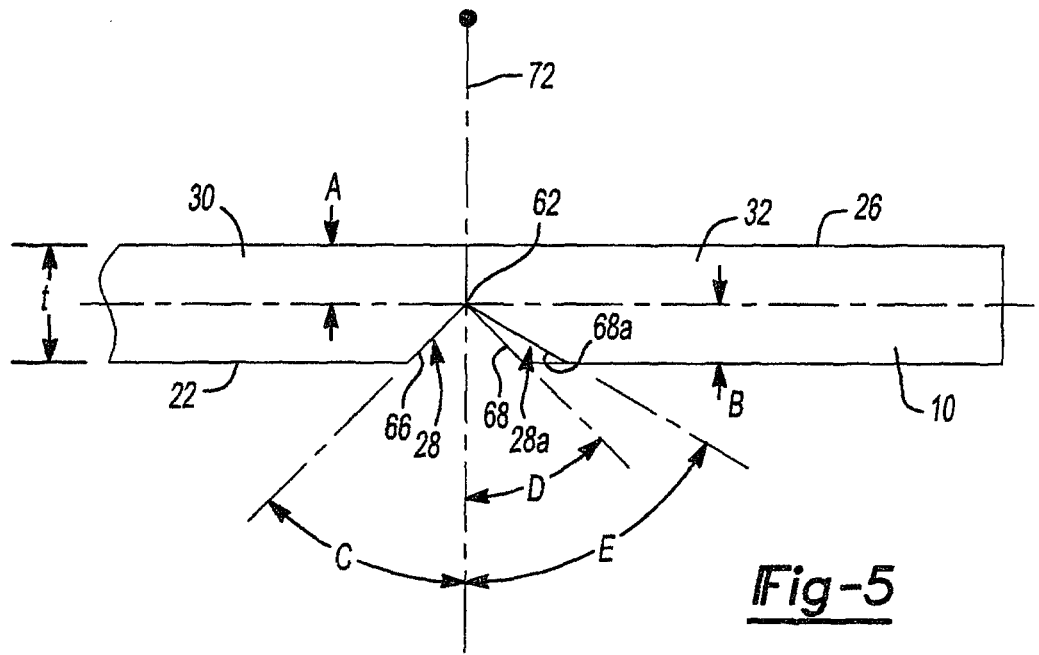
FIG. 5 is a cross-sectional side view of a portion of the formed blank of FIG. 2.
Figure 6:
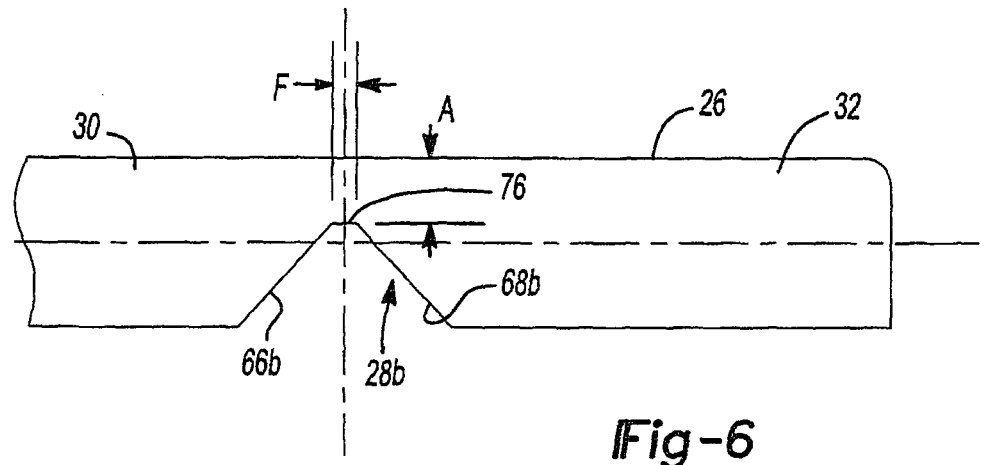
FIG. 6 is a cross-sectional side view of another formed blank according to the teachings of the present disclosure.

FIGS. 5 and 6 depict alternate cross-sectional constructions of groove 28, a groove 28a and a groove 28b. FIG. 5 depicts grooves 28 and 28a. Groove 28 includes a total included angle of approximately 90°. First wall 66 defines an angle "C" with a line 72 extending perpendicular to surface 22. Angle C may be 45°. Groove 28 includes wall 68 where wall 68 forms an angle "D" with line 72. Angle D may be 45°. It is contemplated that line 72 may extend parallel to the direction of movement of the forming dies 14, 16 or the trimming dies 54, 56. As such, line 72 may not always be perpendicular to surface 22 if the part has a three-dimensional shape.

Because second wall 68 is formed on scrap portion 32, it may be desirable to form groove 28a instead of groove 28. Groove 28a may include a second wall 68a that defines an angle "E" with perpendicular line 72. Angle E may range from 45°-60°. A larger angle may facilitate movement of material from scrap portion 32 toward part portion 30 during actuation of forming press 12. Material from scrap portion 32 is drawn toward the area of the die forming part portion 30 as blank 10 is being shaped within forming press 12. Depending on the depth of draw, the movement of material may be relatively small or relatively great. Increasing angle E may minimize wear on chisel 18 during the forming process. In the embodiment in FIG. 5, first wall 66 and second wall 68 as well as first wall 66 and second wall 68a intersect at bottom 62.

FIG. 6 depicts alternate groove 28b. Groove 28b includes a first wall 66b and a second wall 68b intersecting a bottom wall 76. Bottom wall 76 may be substantially planar as depicted in FIG. 6 or may alternatively be curvilinearly shaped. Bottom wall 76 extends substantially parallel to surface 26. By including an increased zone "F" having minimum thickness A, positioning of formed blank 10 within trimming press 50 need be less accurate. In particular, edge 60 of lower trimming die 54 may be aligned to intersect anywhere along bottom wall 76 or substantially adjacent to bottom wall 76 to provide a desirable edge condition on part portion 30.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A method of stamping a sheet metal component, comprising:
   forming a steel sheet in a stamping press to include an indentation extending from a first surface of the sheet toward a second opposite surface of the sheet and extending about a periphery of the first surface; and
   separating a first portion of the sheet from a second portion of the sheet in a trimming press, wherein the separating occurs by shearing through the remaining sheet material located at the indentation previously formed;
   wherein the forming step includes defining the indentation to have a cross section including angled, substantially planar surfaces, and wherein a first angled surface of the angled surfaces extends at forty-five degrees to a line perpendicular to the first surface and a second angled surface of the angled surfaces extends at an angle from the line perpendicular to the first surface ranging from forty-five to sixty degrees, and wherein a minimum sheet thickness is defined between the indentation and the second opposite surface.

2. The method of claim 1 wherein the forming includes deforming the sheet to include a three-dimensional shape.

3. The method of claim 1 further including aligning the indentation with an intersection between moveable dies of the trimming press.

4. The method of claim 1 further including heating the sheet prior to the forming operation.

5. The method of claim 4 further including rapidly cooling the sheet prior to the trimming operation to harden at least a portion of the sheet.

6. The method of claim 1 wherein said step of separating a first portion of the sheet from a second portion includes forming the first portion to have a fractured section.

7. The method of claim 6 wherein said step of forming the first portion to have a fractured section includes forming the fractured section adjacent to said first angled surface.

8. The method of claim 1 wherein said step of separating a first portion from a second portion includes a step of forming an edge interconnecting and extending about the perimeter of the first and second surfaces, and wherein said formed edge includes the first angled surface.

9. The method of claim 8 wherein said step of forming an edge includes the step of creating a sheared portion adjacent to said first angled surface.

10. A method of stamping a sheet metal component, comprising:
heating a steel sheet;
forming the steel sheet in a stamping press to include a groove extending from a first surface of the sheet toward a second opposite surface of the sheet;
quenching the sheet after forming; and
separating a first portion from a second portion of the sheet in a trimming press, wherein the separating occurs along the groove previously formed;
wherein the forming step includes defining the groove to have a cross section including angled, substantially planar surfaces, and wherein a first angled surface of the angled surfaces extends at forty-five degrees to a line perpendicular to the first surface and a second angled surface of the angled surfaces extends at an angle from the line perpendicular to the first surface ranging from forty-five to sixty degrees, and wherein a minimum sheet thickness is defined between the groove and the second opposite surface.

11. The method of claim 10 wherein the forming includes deforming the sheet to include a three-dimensional shape.

12. The method as set forth in claim 10 wherein the angled surfaces intersect at a point.

13. The method of claim 12 wherein the point defines a maximum groove depth.

14. The method of claim 13 wherein a minimum sheet thickness is defined between the point and the second sheet surface.

15. The method of claim 14 wherein the minimum sheet thickness ranges from one-third to two-thirds of the nominal sheet thickness.

16. The method of claim 10 wherein the angled surfaces each intersect another surface extending substantially parallel to the second surface.

17. The method of claim 16 wherein a minimum sheet thickness is defined between the another surface and the second surface, the sheet separating at the minimum thickness.

18. The method of claim 10 wherein the angled surfaces are positioned to define an included angle of at least ninety degrees.

19. The method of claim 10 wherein the first and second angled surfaces intersect one of a point, a curved surface and a substantially planar surface.

20. The method of claim 10 further including aligning the groove with an intersection between relatively moveable dies of the trimming press.

21. The method of claim 20 further including providing a radius on the one of the moveable dies of the trimming press operable to contact the second surface of the sheet.

22. The method of claim 21 wherein the radius is a dimension substantially ten percent of the sheet thickness.

23. The method of claim 10 wherein the groove extends peripherally about the first surface of the sheet.

* * * * *